Nov. 7, 1950 P. L. LOEWE ET AL 2,529,035
FORWARD AND REVERSE GEARING FOR LAWN MOWERS
Original Filed April 8, 1944 3 Sheets-Sheet 1

Inventors
Peter L. Loewe
Eugene L. Boyce
by Parker & Carter
Attorneys

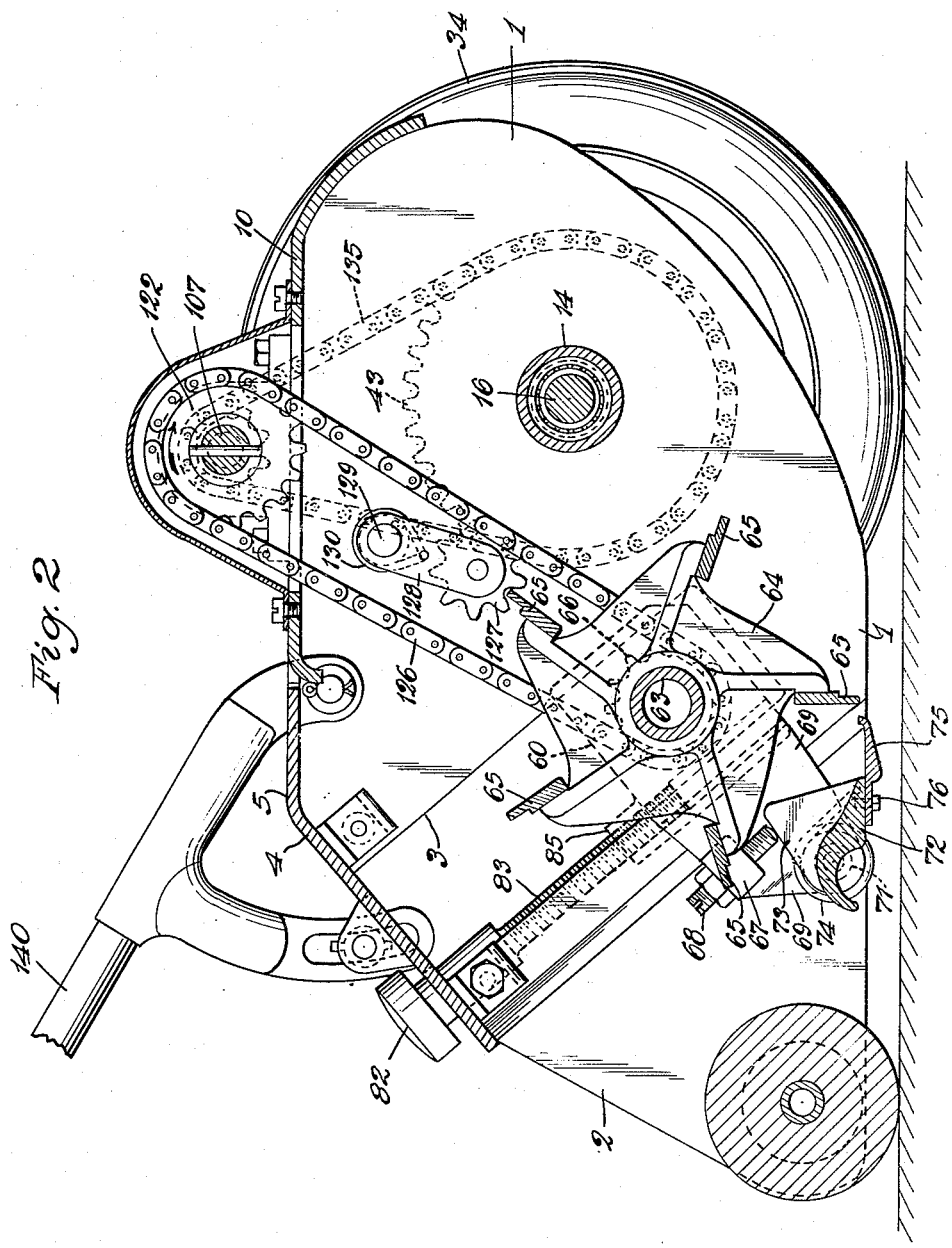

Nov. 7, 1950   P. L. LOEWE ET AL   2,529,035
FORWARD AND REVERSE GEARING FOR LAWN MOWERS
Original Filed April 8, 1944   3 Sheets-Sheet 3

Inventors
Peter L. Loewe
Eugene L. Boyce
by Parker & Carter
Attorneys.

Patented Nov. 7, 1950

2,529,035

UNITED STATES PATENT OFFICE 2,529,035

FORWARD AND REVERSE GEARING FOR LAWN MOWERS

Peter L. Loewe and Eugene L. Boyce, Chicago, Ill., assignors, by mesne assignments, to Pioneer Gen-E-Motor Corporation, Chicago, Ill., a corporation of Delaware Original application April 8, 1944, Serial No. 530,102. Divided and this application October 27, 1944, Serial No. 560,574

3 Claims. (Cl. 74—355)

Our invention relates to an improvement in lawn mowers and driving means therefor. One purpose is to provide an improved drive and clutch connection for power driven units including lawn mowers.

Another purpose is to provide improved means for sharpening the blades of a lawn mower rotary cutter.

Other purposes will appear from time to time throughout the specification and claims.

Our invention is illustrated more or less diagrammatically in the accompanying drawings, wherein Figure 1 is a perspective view;

Figure 2 is a vertical section, on an enlarged scale, in a plane perpendicular to the axis of rotation of the cutter;

Like parts are indicated by like characters throughout the specification and drawings.

Figure 1:
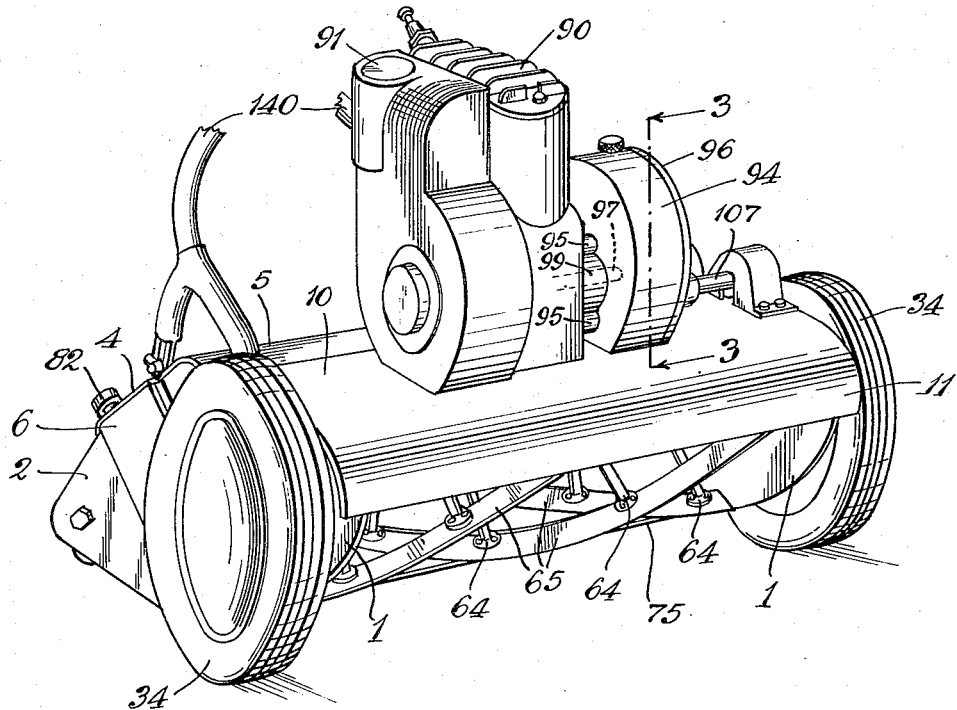

The present application is a division of our copending application Serial No. 530,102, filed in the United States Patent Office on April 8, 1944, now Patent Number 2,378,488.

Referring to the drawings, the lawn mower illustrated includes a chassis structure having a pair of side plates 1. Each side plate has a rearwardly extending part 2 and is provided with a wide slot or cut away portion 3 having parallel walls, the walls or edges being upwardly and rearwardly inclined toward an inclined edge portion 4 of the side plate. The side plates have an upper generally horizontal edge portion 5. The slotted portion of each plate may be outwardly masked by any suitable outer element 6. The upper edges of the side plates 1 are connected by a top plate 10 which serves as a support for the motor, below described, which operates the lawn mower. The plates 1 are further connected by a tubular sleeve or strut 14 shown in section in Figure 2. Rotatably mounted within the strut 14 is the wheel shaft or axle 16 which may be mounted in any suitable bearings. Wheels generally indicated as 34 may be mounted in any suitable fashion on the axle 16. Details of the wheel structure do not of themselves form part of the present invention and are not illustrated. The wheel assembly, however, may be driven by any suitable sprocket 43 from the drive structure which will later be described. Any suitable means may be employed for permitting the wheels to rotate freely when the lawn mower as a whole is drawn or moved backwardly for example by the handle structure, of which 140 forms a part.

The cutter assembly is a unit which may be unitarily inserted in or removed from or adjusted in relation to the above described chassis for example by rotating the knobs 82 to a release position. It may include any suitable end members 60 adjustable along the edges of the slots 3 of the side plates as for example by rotation of the screw 83 extending into the member 85, secured in relation to the side plates 60 and actuated by the external knob 82. The screw structure may be held against endwise movement by any suitable means while its rotation is permitted.

Mounted for rotation between the end members 60 is the shaft 63 which carries any suitable spiders 64 to which are secured the cutter blades 65. The shaft 63 also carries a sprocket 66 by which the cutter may be rotated. The end members 60 also carry lugs 67 adapted to receive any suitable adjusting screw and nut assembly 68. 69 is a web which may be unitary with the end member 60 and the lug 67 and which extends downwardly and is provided with an inwardly extending boss receiving the pin 71 of the cutter bar structure generally indicated as 72. This cutter bar structure has ears 73 which are normally upwardly urged against the ends of the adjusting screws 68 by any suitable means such as the coil spring 74, one end of which is anchored on the cutter bar and the other to the web 69. Thus the ear 73 will be sufficiently urged against the adjusting screws 68. The cutter bar proper 75 may be secured to the above mentioned structure as at 76 and may thereby be adjusted into proper relationship with the path of movement of the cutting edges of the blades 65 during rotation of the cutter.

Mounted on and supported on the transverse top plate 10 is any suitable motor structure, generally indicated at 90, the details of which do not of themselves form part of the present invention. Any suitable fuel storage tank 91 may be employed.

94 is a gear reduction box or housing which also may be recessed or cut away to receive it. 95 are any suitable spacing lugs of the motor structure to which the box 94 may be secured. 96 is a removable end closure for the box 94. 97 indicates the motor shaft which extends through an aperture 98 in the side wall of the member 94. The lugs 95 may be connected with any suitable web 99 to protect the shaft. The shaft 97 is shown in dotted lines in Figure 1 and in end view in Figure 3. The shaft carries a drive pinion or motor driven gear 100. The gear 100 drives the large intermediate gear 101 on a shaft 102, which shaft is supported in a yoke or frame 103 pivoted as at 104. The reversing gear 105, normally in mesh with the gear 106, on the shaft 107, is keyed in relation to the intermediate gear 101, to constitute a cluster gear. In mesh with the reversibly driven gear 106 is the idler 108 on the stub shaft or pin 109 herein shown as mounted on the side plate 96.

Figures 3, 4:
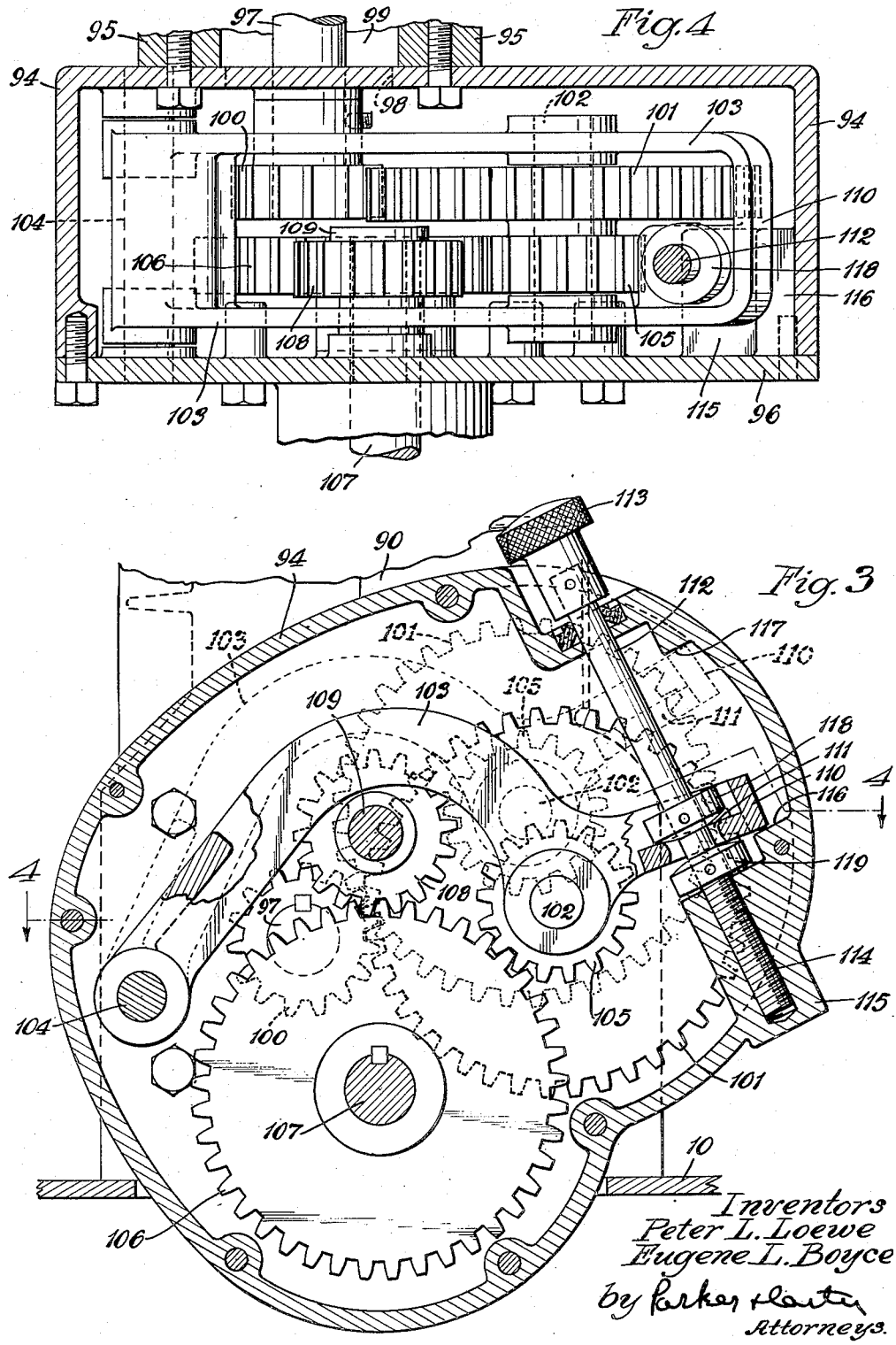
Figure 3 is a vertical section on a still larger scale on the line 3—3 of Figure 1.
Figure 4 is a section on the line 4—4 of Figure 3.

When a reversal of the direction of drive is desired, it may be obtained by shifting the yoke 103. The yoke 103 is shown in Figure 3 as having an extension 110, apertured as at 111 to receive an adjusting pin 112, having an external manually operable knurled head 113 and an inner portion 114 in screw threaded relationship with the boss 115 of the member 94. 116 is a limit stop formed in the wall 94 and 117 an opposite limit stop. The member 112 carries actuating collars 118, 119 secured thereto. It will be understood that when the parts are in the full line position in which they are shown in Figure 3, the idler is out of the line of drive. If the user rotates the head 113 sufficiently to move the parts to the dotted line position with the end of the yoke 103 against the stop 117, the reversing gear 105 is first disengaged from the gear 106 and is later engaged with the idler 108, which is thereby added to the line of drive. The result is a reversal in the direction of rotation of the driven shaft 107.

Thus, when the user wishes to sharpen the blades, he may do so by reversing the cutter drive, thereby moving the cutter blades in retrograde across the cutter bar 75. The cutter bar may be treated with or may receive any suitable abrasive and may be adjusted into the proper position to abrade or grind the cutting edges of the blades 65.

It will be clear, from Figure 2, that the driving sprocket 122 on the driven shaft 107 is effective, through the chain 126 and the sprocket 66, to drive the rotary cutter. Any suitable chain tensioning means may be employed such as the link 128 pivoted as at 129 and having at its free end, an idler sprocket 127. The link 128 and the sprocket 127 may yieldingly urge toward the chain 126 by the spring 130. The chain 135, passing about the sprocket 43 is effective to drive the wheel assembly.

It will be realized that whereas we have shown and described an operative device, still many changes might be made in the size, shape, number and arrangement of parts without departing materially from the spirit of our invention. We wish, therefore, that our showing be taken as in a broad sense diagrammatic and illustrative, rather than limiting us to our precise showing.

The use and operation of the invention are as follows:

It is extremely desirable to provide in connection with lawn mowers, means for sharpening the blades without dismantling or altering the lawn mower. It has been customary in the past, either to take the lawn mower to a shop or else to alter or interrupt the drive of the cutter in order to permit sharpening at the place of use.

A purpose of our invention is to provide driving means which includes reversing means adapted for easy operation. For example, if the user of the lawn mower wishes to sharpen the blades, he preferably first stops the engine and then moves the lever 103, by rotation of the knob 113, to interpose the idler 108 in the line of drive, which reverses the direction of rotation of the driven shaft 107. This reversal is obtained by moving the pinion 105 out of engagement with the gear 106 and into engagement with the idler 108. No change of the normal line of drive is involved and the only movement necessary, that of the pinion 105 and its goose-necked lever 103, is obtained by a readily actuated manual member. We illustrate, for example, the screw 114 with its associated collar structure 118, 119, the screw being actuated by the external handle 113. It will be understood, of course that any other suitable actuating means may be employed. It is convenient in use, however, to have a control assembly which includes an external portion which can be readily operated and which may, for example, be operated by hand, and without the necessity of altering or adjusting or adding or subtracting any part of the transmission beyond moving the lever 103 to include the idler 108 in the line of drive.

We claim:

1. A reversible drive for lawn mowers and the like, including a motor, a unidirectional motor driven gear, a reversibly driven gear, intermediate gears rotatable in unison about a common movable axis, an idler gear rotatable about a fixed axis and constantly in mesh with the reversibly driven gear, one of said intermediate gears being in constant mesh with said motor driven gear, and another of said intermediate gears constituting a reversing gear rotatable about said movable axis and constituting an element in the line of drive between said motor driven gear and said reversibly driven gear, means for normally holding the reversing gear in mesh with the reversibly driven gear, and for selectively moving it bodily in its own plane of rotation out of mesh with said reversibly driven gear and into mesh with said idler gear, including readily manually operable actuating means for moving said reversing gear through its range of possible movement.

2. In a reversible drive for motor driven lawn mowers and the like, a unidirectional motor driven gear and a reversibly driven gear, both said gears being rotatable about fixed axes, and a driving connection between said fixed axis gears including an idler gear rotatable about a fixed axis, in mesh with one of them, and a plurality of intermediate gears rotatable in unison about a common movable axis, one of said intermediate gears being in constant mesh with said motor driven gear and another of said intermediate gears being movable selectively into mesh with the idler gear or with the reversibly driven gear which is constantly in mesh with the idler gear.

3. In a reversible drive for motor driven lawn mowers and the like, a gear box, a unidirectional motor driven shaft, rotatable about a fixed axis, extending into said gear box, a reversibly driven reel driving shaft, rotatable about a fixed axis, extending into said gear box, a gear mounted on each said shaft for rotation about a fixed axis, an idler mounted for rotation about a fixed axis, and in mesh with one of said gears, said idler being mounted on a bearing extending inwardly from a wall of said gear box, a movably mounted arm in said gear box, means for moving said arm through a predetermined path, including a manually engageable element extending exteriorally of said gear box, and a plurality of intermediate gears mounted for rotation in unison on said arm, one of said gears being in constant mesh with one of the gears rotatable about a fixed axis, and the other being movable selectively into and out of mesh with the idler gear in response to movement of said arm.

PETER L. LOEWE.
    EUGENE L. BOYCE.

REFERENCES CITED

The following references are of record in the file of this patent:

UNITED STATES PATENTS

| Number | Name | Date |
|---|---|---|
| 1,047,579 | Seelig | Dec. 17, 1912 |
| 1,185,717 | Roberts | June 6, 1916 |
| 1,200,620 | Johnson | Oct. 10, 1916 |
| 1,724,409 | Ott | Aug. 13, 1929 |
| 1,734,713 | Carlson | Nov. 5, 1929 |
| 2,046,412 | Reynolds | July 7, 1936 |
| 2,167,748 | Gebert | Aug. 1, 1939 |
| 2,218,314 | Johnson | Oct. 15, 1940 |
| 2,220,543 | Peterson | Nov. 5, 1940 |

FOREIGN PATENTS

| Number | Country | Date |
|---|---|---|
| 229,883 | Switzerland | Feb. 16, 1944 |
| 424,993 | Germany | Feb. 10, 1926 |